US011840484B2

(12) United States Patent
Drake et al.

(10) Patent No.: US 11,840,484 B2
(45) Date of Patent: Dec. 12, 2023

(54) CONVERSION OF GYPSUM WASTE INTO FOAMED CONSTRUCTION MATERIAL

(71) Applicant: Washington State University, Pullman, WA (US)

(72) Inventors: David Ronald Drake, Pullman, WA (US); Taiji Miyasaka, Pullman, WA (US)

(73) Assignee: Washington State University, Pullman, WA (US)

( * ) Notice: Subject to any disclaimer, the term of this patent is extended or adjusted under 35 U.S.C. 154(b) by 178 days.

(21) Appl. No.: 17/440,971

(22) PCT Filed: Mar. 20, 2020

(86) PCT No.: PCT/US2020/023810
§ 371 (c)(1),
(2) Date: Sep. 20, 2021

(87) PCT Pub. No.: WO2020/197986
PCT Pub. Date: Oct. 1, 2020

(65) Prior Publication Data
US 2022/0162126 A1 May 26, 2022

Related U.S. Application Data

(60) Provisional application No. 62/963,881, filed on Jan. 21, 2020, provisional application No. 62/824,902, filed on Mar. 27, 2019.

(51) Int. Cl.
*C04B 28/14* (2006.01)
*B32B 5/18* (2006.01)
(Continued)

(52) U.S. Cl.
CPC ............. *C04B 28/142* (2013.01); *B32B 5/18* (2013.01); *B32B 13/08* (2013.01); *C04B 11/005* (2013.01);
(Continued)

(58) Field of Classification Search
CPC ......... B09B 3/21; B09B 3/25; B28B 19/0092; B32B 13/08; B32B 2250/03;
(Continued)

(56) References Cited

U.S. PATENT DOCUMENTS

| 2012/0153058 A1 | 6/2012 | Nishi et al. | |
| 2015/0114264 A1* | 4/2015 | Taboulot | C04B 26/026 106/645 |
| 2021/0002172 A1* | 1/2021 | Kruspan | C04B 11/262 |

FOREIGN PATENT DOCUMENTS

| CN | 105016636 | 12/2017 |
| CN | 110698091 | 1/2020 |

(Continued)

OTHER PUBLICATIONS

International Search Report and Written Opinion dated Jun. 9, 2020, in International Application No. PCT/US20/23810, 7 pages.

*Primary Examiner* — Hai Vo
(74) *Attorney, Agent, or Firm* — Liang IP, PLLC

(57) ABSTRACT

Techniques of forming a foamed insulation material from gypsum waste are disclosed herein. One example technique includes mechanically comminuting the gypsum waste from an original size into particles of gypsum at a target size smaller than the original size and mixing the particles of the gypsum with a binder to form a mixture of particles and binder. The binder is configured to bind the particles of gypsum upon hydration. The example technique can further include performing air entrainment on the mixture until a foam is formed from the mixture having the particles of gypsum and binder. The foam has water that causes the
(Continued)

binder to bind the particles of gypsum. The example technique can then include removing moisture from the mixture with the formed foam to form a foamed insulation material from the particles of gypsum.

20 Claims, 4 Drawing Sheets

(51) Int. Cl.
　　　*B32B 13/08*　　　(2006.01)
　　　*C04B 11/00*　　　(2006.01)
　　　*C04B 18/24*　　　(2006.01)
　　　*C04B 38/10*　　　(2006.01)
　　　*B28B 19/00*　　　(2006.01)
　　　*C04B 111/00*　　　(2006.01)
(52) U.S. Cl.
　　　CPC ............ *C04B 18/241* (2013.01); *C04B 38/10* (2013.01); *B28B 19/0092* (2013.01); *B32B 2250/03* (2013.01); *B32B 2266/049* (2016.11); *B32B 2607/00* (2013.01); *C04B 2111/0062* (2013.01); *C04B 2201/20* (2013.01); *C04B 2201/30* (2013.01)

(58) Field of Classification Search
　　　CPC . B32B 2266/049; B32B 2607/00; B32B 5/18; C04B 11/005; C04B 14/06; C04B 14/08; C04B 14/10; C04B 14/108; C04B 14/16; C04B 14/18; C04B 14/22; C04B 14/42; C04B 16/06; C04B 18/068; C04B 18/08; C04B 18/141; C04B 18/146; C04B 18/167; C04B 18/24; C04B 18/241; C04B 20/026; C04B 2111/00146; C04B 2111/0062; C04B 2111/00724; C04B 2111/28; C04B 22/064; C04B 2201/20; C04B 2201/30; C04B 2201/32; C04B 24/38; C04B 28/04; C04B 28/142; C04B 38/10; C04B 7/12; E04C 2/049; Y02W 30/91
　　　See application file for complete search history.

(56) References Cited

FOREIGN PATENT DOCUMENTS

| | | |
|---|---|---|
| JP | 2017-159253 | 9/2017 |
| WO | WO2020014455 | 1/2020 |

\* cited by examiner

CONVERSION OF GYPSUM WASTE INTO FOAMED CONSTRUCTION MATERIAL

CROSS-REFERENCE TO RELATED APPLICATION(S)

This application is a continuation of and claims priority to U.S. Provisional Application Nos. 62/824,902, filed on Mar. 27, 2019, and 62/963,881, filed on Jan. 21, 2020.

BACKGROUND

Drywall (also known as plasterboard, wallboard, sheet rock, gypsum board, buster board, custard board, or gypsum panel) is a sheet-like material made from gypsum or calcium sulfate dihydrate ($CaSO_4 \cdot 2H_2O$). Drywall is typically produced by extruding gypsum between sheets of facing and backing papers to form individual panels. Such panels can then be used in construction of interior walls and ceilings of residential or commercial buildings.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

During construction of buildings, some drywall pieces unavoidably become waste. For instance, construction of a two thousand square foot house can produce more than a ton of waste of drywall pieces. High quality synthetic gypsum can be produced as a byproduct of sulfur-emission reduction systems on coal-fired power plants. As such, recycling or repurposing of gypsum-containing waste (or "gypsum waste") is uncommon. Instead, such gypsum waste is typically disposed of in landfills. However, landfill disposal of gypsum waste can present a few difficulties. First, large amounts of gypsum waste can quickly exhaust landfill spaces. Secondly, anaerobic soil bacteria in landfills can consume sulfur in gypsum waste and produce hydrogen sulfide. The odor from hydrogen sulfide can be a nuisance in small concentrations and even toxic to humans in higher concentrations. As a result, some landfills no longer accept gypsum waste generated from construction.

Several embodiments of the disclosed technology are directed to techniques for manufacturing foamed construction material using gypsum waste such as from building construction. In one implementation, gypsum waste is collected and pulverized into a gypsum powder or otherwise comminuted. The gypsum powder can then be combined with a binder and a suitable amount of water into a paste or other forms of a suspended solid mixture (referred to as "gypsum mixture"). The binder can include a cementitious, a non-cementitious binder, or a combination thereof. Examples of a cementitious binder include Portland cement, pozzolans/geopolymers, lime, clay, or a combination thereof. Examples of a non-cementitious binder can be plant or algae-based polymers/polysaccharides such as sodium alginate and agar agar.

In other implementations, the gypsum mixture can also include suitable types of additives such as one or more fibrous materials. Example fibrous materials can include natural or synthetic reinforcing fibers such as straw, glass, plastic, cellulose, or other suitable types of fibers. In one particular example, fibers from recycled paper can be used as reinforcing fibers. In further implementations, the gypsum mixture can also include fine aggregates such as sand and crushed rock, suitable pigments of color, or water-proofing additives (e.g., asphalt emulsions, sodium silicate, metal soaps, and siloxanes).

The gypsum mixture can then be subject to air entrainment to form a foam-like material. Air entrainment can be accomplished using various technique. In one example, a pre-made foam produced from water and a surfactant can be used for air entrainment. In another example, the gypsum mixture can also incorporate a surfactant. Foam can then be generated through mechanical agitation of the gypsum mixture having the surfactant. In yet another example, the gypsum mixture can incorporate various chemical admixtures (e.g., aluminum powder and sodium hydroxide) that react to form a foam upon hydration.

The air entrained gypsum mixture can then be placed in a mold and cured for forming a block, a panel, a sheet, or other suitable shape and/or size of a construction material. For example, the air entrained mixture with a cementitious binder can be cured at ambient temperature and pressure with management of drying speed using one or more sealants or films. In another example, the air entrained gypsum mixture can also be cured at elevated temperatures and humidity using low-pressure steam or using autoclave. In other examples, the air entrained gypsum mixture utilizing one or more biopolymers or other non-cementitious binders can be cured through dehydration, heat application, air circulation, and/or freezing followed by lyophilization.

Depending on application and performance, a percentage of the gypsum waste (with or without facing and backing papers) can range from about 30% to about 90% by weight in the formed foamed construction material. The foregoing percentage range is much higher than other proposed uses for gypsum waste such as being used as an adjunct in concrete, or for construction backfill in controlled low-strength material ("CLSM") mixtures. These proposed uses treat gypsum waste as a cementitious binder that replaces 10%-60% of other binders such as fly ash. However, cementitious binders typically account for only a small percentage of concrete or CLSM mixtures, and a total percentage of gypsum waste in these products ranges only from about 3% to about 30% by weight.

Upon curing, the resulting foamed construction material can have a fine-grained cellular structure that is believed to impart the foamed construction material with superior insulation properties. For example, the foamed construction material can have lower thermal conductivity than typical concrete aggregates such as cellular concrete. The foamed construction material can also be easily modified during construction via cutting or drilling. Fiber reinforcement (e.g., via incorporating facing and backing papers of drywall) offers superior results with respect to friability when compared with autoclaved aerated concrete ("AAC") or cellular concrete. As such, the foamed construction material can be suitable for building weatherization and fire resistance.

The foamed construction material can also have superior fire-retardant property when compared to conventional insulation material such as expanded polystyrene, extruded polystyrene, polyisocyanurate, and polyurethane foams. Unlike plastic foam insulations and other insulation materials, the foamed construction material does not produce large volumes of smoke, emit toxic fumes, or drip molten material when exposed to fire. Without being bound by theory, it is believed that such superior fire-retardant performance is due at least in part to that gypsum is non-flammable and contains approximately 50% by volume chemically combined water. As such, when exposed to fire, energy from heat can be absorbed to convert chemically combined water to steam.

Several embodiments of the disclosed technology can thus divert a large amount of gypsum waste from landfills by forming the foamed construction material that incorporates a large percentage of the gypsum waste. As such, landfill space can be preserved, and the amounts of hydrogen sulfide produced from bacteria consumption of sulfur in the gypsum waste can be significantly reduced. Further, the foamed construction material formed from the gypsum waste can have superior insulation and fire-retardant properties. As such, gypsum waste can be efficiently recycled and converted into useful materials.

DETAILED DESCRIPTION

Various embodiments of techniques for forming a foamed construction material from gypsum waste are disclosed below. In the following description, specific details of components are included to provide a thorough understanding of certain embodiments of the disclosed technology. A person skilled in the relevant art will also understand that the disclosed technology may have additional embodiments or may be practiced without several of the details of the embodiments described below with reference to FIGS. 1-3B.

As used herein a "gypsum waste" generally refers to construction materials that contain gypsum or calcium sulfate dihydrate ($CaSO_4 \cdot 2H_2O$). For example, a gypsum waste can include pieces of drywall, plasterboard, wallboard, sheetrock, gypsum board, buster board, custard board, or gypsum panel from construction of interior walls or ceilings of residential or commercial buildings. A gypsum waste can have various shapes or sizes such as panels, blocks, shards, or portions thereof. A gypsum waste can also include additional elements than gypsum. For instance, a gypsum waste can include a drywall panel (or portions thereof) with facing and backing papers that sandwich gypsum therebetween. A gypsum waste can also include other additives that can reduce mildew, flammability, and water absorption.

Recycling of gypsum waste such as from waste drywall is uncommon because high quality synthetic gypsum can be produced as a byproduct of sulfur-emission reduction systems on coal-fired power plants. However, disposal of gypsum waste can present several difficulties. For example, large volumes of building waste can quickly exhaust landfill spaces. Secondly, anaerobic soil bacteria in landfills can consume sulfur in gypsum and produce hydrogen sulfide. The odor from hydrogen sulfide can be a nuisance to humans in small concentrations and even toxic in higher concentrations. As a result, some landfills no longer accept gypsum waste.

Several embodiments of the disclosed technology are directed to efficient manufacturing of a foamed construction material using gypsum waste. In one example, gypsum waste can be pulverized or otherwise comminuted and combined with a binder into a mixture of solid suspension. The mixture can then be subject to air entrainment using, for instance, a surfactant and mechanical agitation. As such, the solid suspension can be processed into a foam like material, which can then be placed into a mold and cured into a block, panel, or other suitable shapes of a foamed construction material. As discussed in more detail later, examples of the formed foamed construction material exhibit superior insulation and fire-retardant properties that other insulation materials. Several embodiments of the disclosed technology can thus efficiently recycle gypsum waste by diverting a large amount of gypsum waste from landfills, as discussed below in more details with reference to FIGS. 1-4D.

Figure 1:
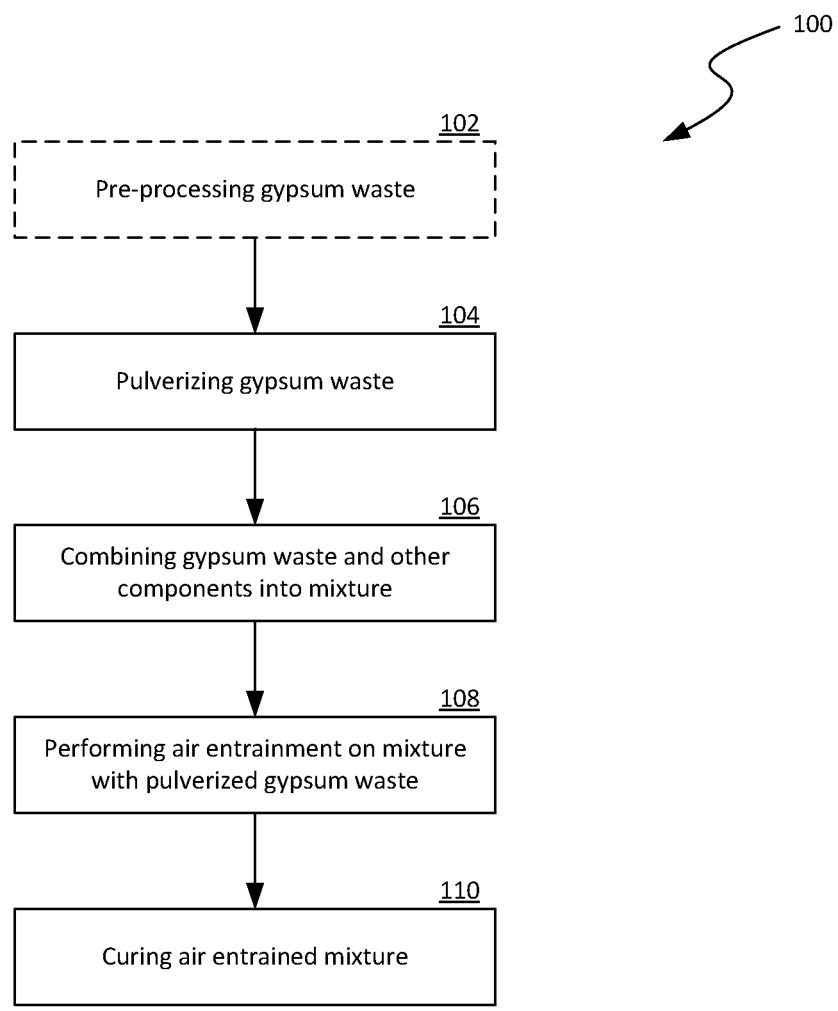
FIG. 1 is a flowchart illustrating a process for forming a foamed construction material from gypsum waste in accordance with embodiments of the disclosed technology.

FIG. 1 is a flowchart illustrating a process 100 for forming a foamed construction material from gypsum waste in accordance with embodiments of the disclosed technology. As shown in FIG. 1, the process 100 can include an optional stage 102 of pre-processing a gypsum waste. In certain embodiments, pre-processing the gypsum waste can include cleaning facing and backing papers of the gypsum waste using pressurized air or via other suitable techniques. In other embodiments, pre-processing the gypsum waste can include removing the facing and backing papers from the gypsum waste. In further embodiments, pre-processing the gypsum waste can include size reduction, shape modification, or other suitable mechanical operations that break up the gypsum waste into appropriately sized/shaped pieces. In yet further embodiments, the optional pre-processing stage 102 may be omitted.

Figure 2A:
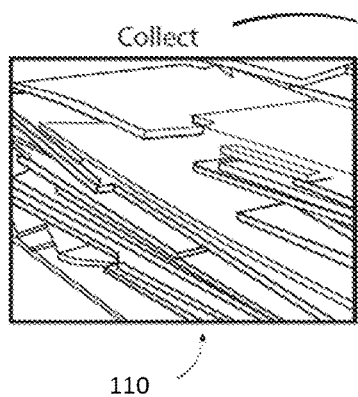
FIGS. 2A-2E are schematic diagrams illustrating an example system suitable for performing the process of FIG. 1 in accordance with embodiments of the disclosed technology.
Figure 2B:
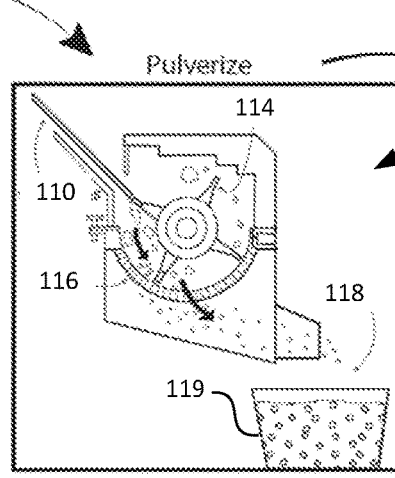

As shown in FIG. 1, the process 200 can also include pulverizing the gypsum waste into a gypsum powder using a machine such as a hammer mill, rolling mill, crushing mill, or similar. Depending on dry processing machinery, facing and backing papers may be mechanically separated from the gypsum powder and removed by screening or winnowing. In certain embodiments in which the facing and backing papers are removed, facing and backing papers can be separately processed (e.g., shredded) and reincorporated into a mixture with the gypsum powder. In other embodiments, other fibers (e.g., from wastepaper) may be incorporated into the mixture in addition to or in lieu of the processed facing and backing papers. In such embodiments, the removed facing and backing papers may be processed in the same manner and along with other suitable wastepaper. Images of an example gypsum powder and shredded wastepaper are shown in FIGS. 2A and 2B, respectively. Though pulverizing is illustrated in FIG. 1, in other embodiments, the gypsum waste can be comminuted via shredding, cutting, or other suitable techniques.

In certain embodiments, a size of the gypsum powder can be from about 0.074 mm (#200 sieve) to about 0.355 mm (#50 sieve). In other embodiments, the gypsum powder can have other suitable sizes depending on application and target structure of formed foamed insulation material from the gypsum waste. The following table lists particle size distribution of several example gypsum powders:

| Sample # | Nominal sample mass (g) | Sieved mass (g) | Retained on 0.355 mm (#50) sieve (g\|%) | Retained on 0.15 mm (#100) sieve (g\|%) | Retained on 0.074 mm (#200) sieve (g\|%) | Particles ≤0.074 mm (g\|%) |
|---|---|---|---|---|---|---|
| 1 | 500 | 488 | 257\|53 | 186\|38 | 41\|8 | 6\|1 |
| 2 | 500 | 493 | 266\|54 | 169\|34 | 50\|10 | 9\|2 |
| 3 | 500 | 507 | 288\|57 | 173\|34 | 41\|8 | 6\|1 |
| 4 | 500 | 497 | 308\|62 | 150\|30 | 32\|6 | 8\|2 |
| 5 | 500 | 494 | 298\|60 | 151\|31 | 39\|8 | 7\|1 |
| Average | 500 | 496 | 283\|57 | 166\|33 | 40\|8 | 7\|1 |

In certain implementations, an additional fiber source (e.g., wastepaper) can be incorporated into the mixture by reducing the fiber source to a fine shred using a hammer mill or similar. For example, old newsprint ("ONP") can be used as a wastepaper feedstock. In additional examples, other types of recycled papers, such as loose cellulose insulation (a wastepaper product containing additives for fire, mold, and insect resistance) or corrugated cardboard may also be used. In one implementation, deinking of ONP or other wastepaper may be avoided. In other implementations, ONP or other wastepaper may be deinked, or additional pigments may be added to achieve a desired final color in the formed foamed insulation material. Depending on machines used, processing the wastepaper may be performed simultaneously with processing the gypsum waste.

As shown in FIG. 1, the process 200 can then include combining the pulverized gypsum waste with a binder and other optional components into the mixture at stage 106. Certain commercially available gypsum waste includes a layer of gypsum mixed with glass or paper fibers and other additives sandwiched between facing and backing papers. In certain embodiments, all materials in the gypsum waste may be used to produce the foamed insulation material. As such, the gypsum waste can be pulverized without substantially removing the facing and backing papers. While incorporation of gypsum waste from demolition may entail additional processing to remove mechanical fasteners and minimize contamination from paint and other wall covering, suitable modification of the process described herein can allow use of gypsum waste from demolition as well.

The binder can be configured to bind various component of the mixture. In certain embodiments, the binder can include a cementitious binder. Examples of a suitable cementitious binder can include Portland cement, pozzolans/geopolymers (e.g., fly ash, ground granulated blast furnace slag, wood ash, etc.), lime, or powdered dry clay, or mixtures of at least one of the foregoing materials thereof. The cementitious binder can be thoroughly mixed with other dry component(s) in the mixture using, for example, a ribbon mixer, a planetary mixer with paddle, a pan mixer, or other suitable types of mixture. In other embodiments, a non-cementitious binder can be included in the mixture to replace at least a part of a cementitious binder. Examples of non-cementitious binder can include plant- or algae-based biopolymers introduced in a planetary mixer or similar.

Depending on desired application and performance, a percentage by dry weight of gypsum waste in the mixtures can range from about 30% to about 90%. Also, depending on desired application and performance, percentage by dry weight of the cementitious binder in the mixture can range from about 0% to about 20% while the plant- and algae-based biopolymers can range from about 1% to about 10%. Sand or other fine aggregates (e.g., ground glass and rock waste) may also be added in percentage by dry weight up to about 20%. Such fine aggregates can increase the dry and wet compressive strength of the foamed insulation material.

The process 200 can then include performing air entrainment on the mixture with the pulverized gypsum waste at stage 108. In certain implementations, pre-made foams can be incorporated into the mixture with a folding mixer action to reduce loss of entrained air. In other implementations, foam can be developed during mixing by incorporating a surfactant and water. One example surfactant includes a 2% sodium lauryl sulfate dissolved in water with 4% sodium hydroxide (lye) stabilizer. The foam can be developed using, for instance, a mixer capable of vigorous whisking or whipping. In further implementations, foam can be generated by post-mixing chemical reactions such as by incorporating chemical admixtures (e.g., aluminum powder and sodium hydroxide) that react to form a foam upon hydration. In any of the foregoing implementations, mixing can be thorough and rapid so that air entrained mixture can be dispensed into a mold before significant expansion takes place.

Though particular sequences of operations are described above, in certain embodiments, operations may be performed in other suitable sequences. For example, in one embodiment, wet ingredients (e.g. water, an alginate solution, or an agar solution) can be added first, blended, then combined with ONP while mixing at high speed. Mixing continues until shredded ONP has separated into individual fibers and desired volume is achieved (e.g., greater than or equal to two-times starting volume). Blended mixture of gypsum powder and the binder (if used) can be added while high speed mixing continues to maintain volume. Aerated mixture can then be dispensed into a mold for curing.

In certain implementations, the foregoing operations may be continuous. Small amounts of plasticizer (e.g. glycerin, <5%) may be added to improve mixture properties. Mixtures containing hydrated agar solution are kept well above solidifying temperature of agar (32-40° C.) during mixing and aeration process. Because hydrated agar solution exhibits hysteresis (i.e., the melting point is significantly higher than the solidifying point), hydrated agar solution may be held at a temperature well above 32-40° C. following hydration. A sodium alginate solution converts rapidly to calcium alginate gel in the presence of calcium-containing substances such as the gypsum powder and Portland cement. Conversion of a solution to gel is advantageous for foam stability, but foam structure may be broken if gelling occurs during high speed mixing. Addition of a small percentage (~1%) of sodium citrate or other sequestrant to wet or dry ingredients may be included to slow the gelling process. In other implementations, the foregoing operations may be performed in a batch, semi-batch, or other suitable types of mode.

As shown in FIG. 1, the process 200 can further include curing the air entrained mixture at stage 110. In certain embodiments, the air entrained mixture can be placed in a mold and cured for forming a block, a panel, a sheet, or other suitable shape and/or size of a construction material. For example, the air entrained mixture with a cementitious binder can be cured at ambient temperature and pressure with management of drying speed using one or more sealants or films. In another example, the air entrained gypsum mixture can also be cured at elevated temperatures and humidity using low-pressure steam or using autoclave. In other examples, the air entrained gypsum mixture utilizing one or more biopolymers or other non-cementitious binders can be cured through dehydration, heat application, air circulation, and/or freezing followed by lyophilization. For instance, the air entrained mixture contains agar can be cured with low pressure steam by cooling the mixture to below 32° C. initially to allow agar to solidify and then reheating the mixture to a curing temperature below an agar melting point (i.e., about 85° C.).

Depending on application and performance, a percentage of the gypsum waste (with or without facing and backing papers) can range from about 30% to about 90% by weight in the formed foamed construction material. The foregoing percentage range is much higher than other proposed uses for gypsum waste such as being used as an adjunct in concrete, or for construction backfill in controlled low-strength material ("CLSM") mixtures. These proposed uses treat gypsum waste as a cementitious binder that replaces 10%-60% of other binders such as fly ash. However, cementitious binders typically account for only a small percentage of concrete or CLSM mixtures, a total percentage of gypsum waste in these products ranges only from about 3% to about 30% by weight.

Upon curing, the resulting foamed construction material can have a fine-grained cellular structure that is believed to impart the foamed construction material with superior insulation properties. For example, the foamed construction material can have lower thermal conductivity than typical concrete aggregates such as cellular concrete. The foamed construction material can also be easily modified during construction via cutting or drilling. Fiber reinforcement (e.g., via incorporating facing and backing papers of drywall) offers superior results with respect to friability when compared with autoclaved aerated concrete ("AAC") or cellular concrete. As such, the foamed construction material can be suitable for building weatherization and fire resistance. Images of example lightweight drywall core, AAC, and foamed construction materials are shown in FIGS. 4A-4D as discussed in more detail below.

The foamed construction material can also have superior fire-retardant property when compared to conventional insulation material such as expanded polystyrene, extruded polystyrene, polyisocyanurate, and polyurethane foams. Unlike plastic foam insulations and other insulation materials, the foamed construction material does not produce large volumes of smoke, emit toxic fumes, or drip molten material when exposed to fire. Without being bound by theory, it is believed that such superior fire-retardant performance is due at least in part to that gypsum is non-flammable and contains approximately 50% by volume chemically combined water. As such, when exposed to fire, energy from heat can be absorbed to convert chemically combined water to steam.

Several embodiments of the disclosed technology can thus divert a large amount of gypsum waste from landfills by forming the foamed construction material that incorporates a large percentage of the gypsum waste. As such, landfill space can be preserved, and the amounts of hydrogen sulfide produced from bacteria consumption of sulfur in the gypsum waste can be significantly reduced. Further, the foamed construction material formed from the gypsum waste can have superior insulation and fire-retardant properties. As such, gypsum waste can be efficiently recycled and converted into useful materials.

FIGS. 2A-2E are schematic diagrams illustrating an example system suitable for performing the process of FIG. 1 using a surfactant in accordance with embodiments of the disclosed technology. As shown in FIG. 2A, gypsum waste 110 can be collected as feedstock for the system shown in FIGS. 2A-2E. In the illustrated embodiment, the collected gypsum waste is shown as panels with various shapes and sizes. In other embodiments, the collected gypsum waste can have other suitable sizes and/or shapes.

As shown in FIG. 2B, the collected gypsum waste 110 collected from FIG. 2A can be fed into a pulverizer 112 to be processed into a gypsum powder 118 collected in a container 119. In the illustrated embodiment, the pulverizer 112 is shown as a hammer mill having rotating hammers 114 (four are shown for illustration purposes) and a screen 116. As the hammers 114 rotate passing the gypsum waste fed into the hammer mill, pieces of the gypsum waste can be crushed into small particles that can fit through the screen 116. The particles exiting from the screen 116 can then be collected as gypsum powder 118 in the container 119.

Figure 2C:
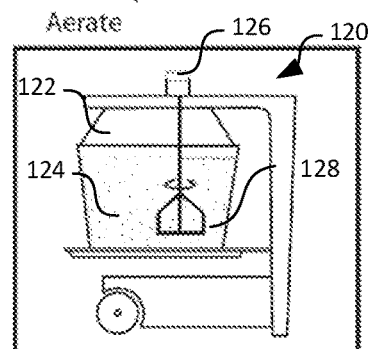

As shown in FIG. 2C, the gypsum powder 118 from FIG. 2B can be combined into a mixture 124 with a binder and then subject to aeration. In the illustrated embodiment, the gypsum powder 118 is shown as being combined with a binder and a surfactant in water in a mixing tank 120. The mixing tank 120 can include a vessel 122 holding the mixture 124 and a motor driving an agitator 128. In certain embodiments, the agitator 128 can include a balloon whisk, a flat whisk, a coil whisk, a ball whisk, a cage whisk, or other suitable types of whisk. In other embodiments, the agitator 128 can include a peddle, a propeller, or other suitable types of agitation device. As shown in FIG. 2C, as the motor 126 rotates the agitator 128, foam can be created in the vessel 122 that binds the various components of the mixture 124 into a foamed mixture 129.

Figure 2D:
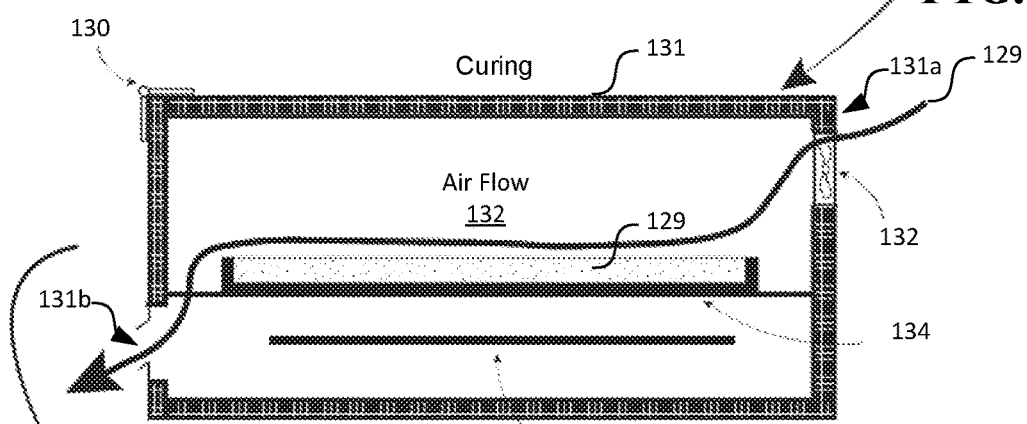

As shown in FIG. 2D, the foamed mixture 129 can then be transferred into a curing device 130 to at least partially remove moisture from the foamed mixture 129. In the illustrated embodiment, the curing device 130 includes an enclosure 131 housing a mold 134 of a target shape and size for receiving an amount of the foamed mixture 129. The enclosure 131 can have an air inlet 131a at which an air mover 132 (e.g., a fan) drives air flow 132 into the enclosure 131. As the air flow 132 passes the foamed mixture 129 in the mold 134, moisture from the foam mixture 129 can be carried away and exhausted through an air outlet 131b of the enclosure 131. In certain embodiments, curing device 130 can optionally include a heater 136 configured to apply heat to the foamed mixture 129 in the mold 134. In other embodiments, the curing device 130 can also include a humidifier, steam injector, and/or other suitable components in addition to or in lieu of at least one of the components shown in FIG. 2D.

Figure 2E:
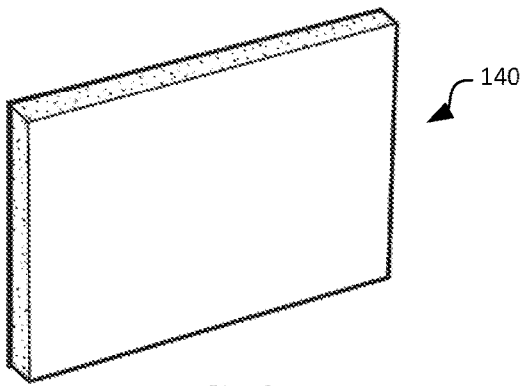

Upon sufficient curing, the foamed mixture 129 can be formed into a foamed insulation material 140 as shown in FIG. 2E. Other shapes, forms, and applications of foamed insulation material 140 include blocks formed with channels to accommodate cast-in-place reinforced concrete lintels and bond-beams; half-blocks for use at corners and door and window openings; tapered blocks for arches, vaults, and domes; insulating roofing and flooring panels, and other suitable construction materials. The foamed insulation material 140 can also be suitable to form construction assemblies in combination with other masonry units, mortars, stuccos, plasters, and other building products.

Figure 3A:
FIGS. 3A and 3B are example photographs of pulverized gypsum waste and shredded wastepaper, respectively, suitable for forming a foamed construction material in accordance with embodiments of the disclosed technology.
Figure 3B:

FIGS. 3A and 3B are example photographs of pulverized gypsum waste and shredded wastepaper, respectively, suitable for forming a foamed construction material in accordance with embodiments of the disclosed technology. As shown in FIG. 3A, the pulverized gypsum waste can form a fine powder with particle size distributions described above with reference to FIG. 1. As shown in FIG. 3B, shredded wastepaper can form small shards of woven or non-woven fibers.

Figure 4A:
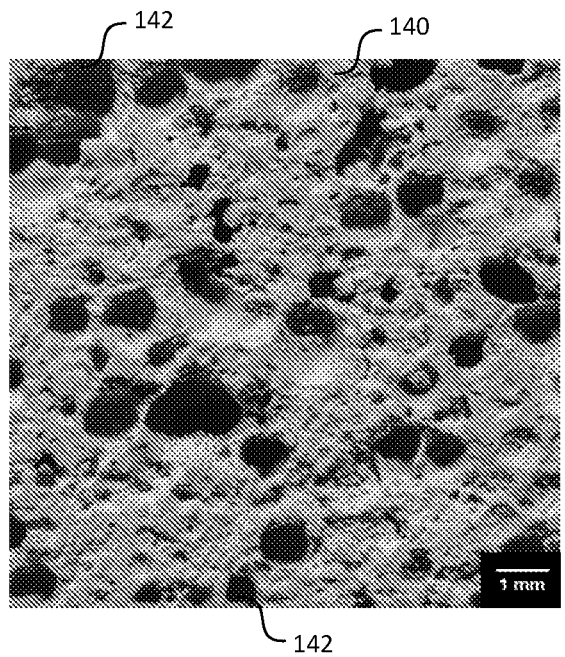
FIG. 4A is an image of an internal microstructure of an example lightweight drywall core.
Figure 4B:
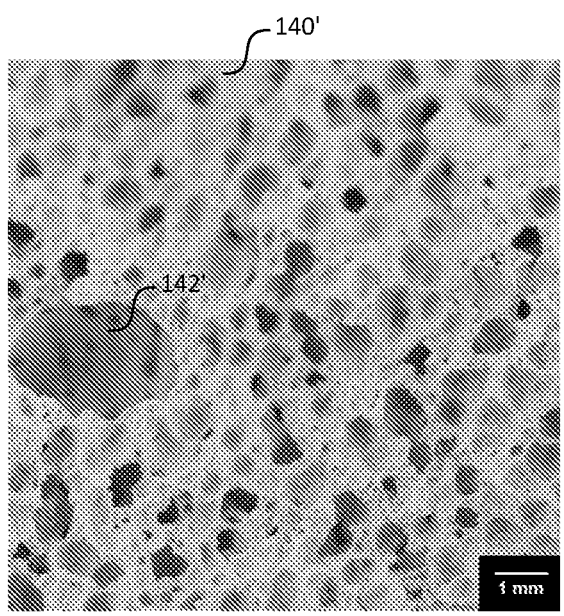
FIG. 4B is an image of an internal microstructure of an example autoclaved aerated concrete.
Figure 4C:
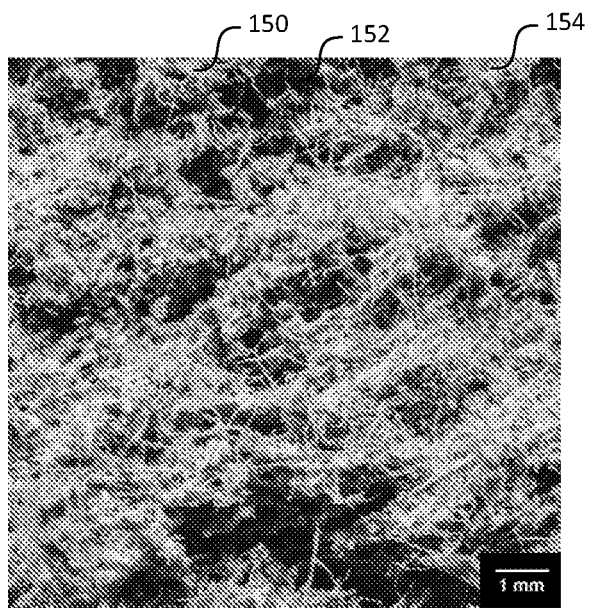
FIGS. 4C and 4D are images of internal microstructures of example foamed construction materials formed in accordance with embodiments of the disclosed technology.
Figure 4D:
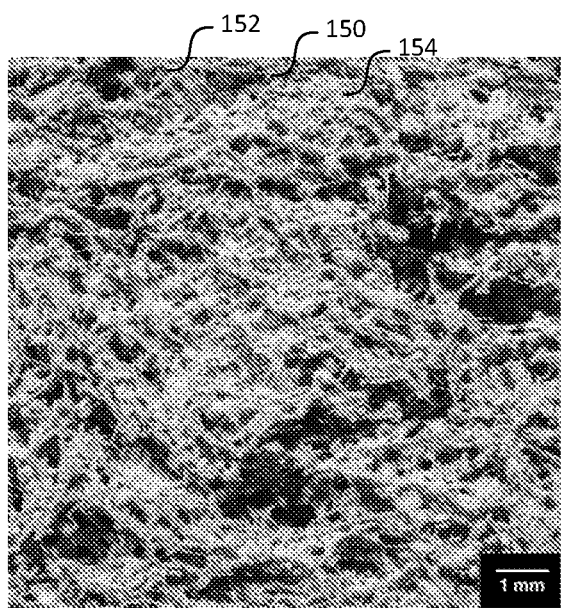

FIG. 4A is an image of an internal microstructure of an example lightweight drywall core; FIG. 4B is an image of an internal microstructure of an example autoclaved aerated concrete ("AAC"); and FIGS. 4C and 4D are images of internal microstructures of example foamed construction materials formed in accordance with embodiments of the disclosed technology. As shown in FIG. 4A, the lightweight drywall core can have a generally solid phase 140 with interstitial voids 142. Similarly, the example AAC can also include a generally solid phase 140' and interstitial voids 142'. In contrast, the example foamed construction materials formed according to embodiments of the disclosed technology can include multiple fibers 150 forming a scaffolding structure with interstitial voids 152. The scaffolding structure can then carry the gypsum powders bound to one another and to the scaffold structure with the included binder. Without being bound by theory, it is believed that the example microstructure of the formed foamed insulation materials as shown in FIGS. 4C and 4D can impart superior insulation and fire retardant properties than the lightweight drywall core and the AAC shown in FIGS. 4A and 4B, respectively, as discussed above with reference to FIG. 1.

From the foregoing, it will be appreciated that specific embodiments of the disclosure have been described herein for purposes of illustration, but that various modifications may be made without deviating from the disclosure. In addition, many of the elements of one embodiment may be combined with other embodiments in addition to or in lieu of the elements of the other embodiments. Accordingly, the technology is not limited except as by the appended claims.

We claim:

1. A method of forming a foamed insulation material from gypsum waste having gypsum sandwiched between facing and backing papers, the method comprising:
mechanically comminuting the gypsum waste from an original size into particles of gypsum at a target size smaller than the original size;
mixing the particles of the gypsum from the mechanically comminuted gypsum waste with a binder to form a mixture of particles and binder, the binder being configured to bind the particles of gypsum upon hydration;
performing air entrainment on the mixture until a foam is formed from the mixture having the particles of gypsum and binder, the foam having water that causes the binder to bind the particles of gypsum; and
removing moisture from the mixture with the formed foam to form a foamed insulation material from the particles of gypsum, wherein the formed insulation material includes:
about 30% to about 90% by dry weight of the particles of gypsum from the gypsum waste;
about 2% to about 15% by dry weight of a paper waste; and wherein the foamed insulation material has:
a dry density range of about 0.2 to about 0.4 g/cm³;
a thermal conductivity ranging from 0.036 W/mK to 0.053 W/mK; and
a resistance to heat transfer from RSI 0.189/cm to RSI 0.916/cm; and
wherein the foamed insulation material has a microstructure that includes a scaffold structure formed by a plurality of paper waste fibers, the scaffold structure having interstitial voids and carrying the particles of gypsum bound to one another and to the scaffold material via the binder.

2. The method of claim 1, further comprising:
separating the facing and backing papers from the gypsum core of the gypsum waste, wherein
mechanically comminuting the gypsum waste includes separately comminuting the gypsum into the particles of gypsum and comminuting the facing and backing papers into particles of paper; and
mixing the particles includes mixing the particles of gypsum with the particles of paper from comminuting the facing and backing papers.

3. The method of claim 1 wherein:
mechanically comminuting the gypsum waste includes comminuting the gypsum in the gypsum waste along with the facing and backing papers into the particles of gypsum and particles of paper; and
mixing the particles of the gypsum includes mixing the particles of the gypsum and the particles of paper with the binder.

4. The method of claim 1 wherein performing air entrainment on the mixture includes one of:
mixing the particles of the gypsum includes adding a surfactant and water into the mixture and applying mechanical agitation to the mixture until the foam is formed from the mixture;
applying a pre-made foam to the mixture; or
forming the foam using chemical admixtures that react to form the foam upon hydration.

5. The method of claim 1 wherein mixing the particles of the gypsum core with the binder includes adding a paper waste to the mixture in a range from about 2% up to 15% of dry weight.

6. The method of claim 1 wherein mixing the particles of the gypsum core with the binder includes adding a plurality of aggregates of sand, stone, gravel, slag, fly ash, glass, silica, expanded slate, clay, pumice, perlite, diatomaceous earth, shale, crushed rock, straw, glass fiber, cellulose fiber, or plastic fiber.

7. The method of claim 1 wherein mixing the particles of the gypsum core with the binder includes one of:
mixing the particles of the gypsum core with a cementitious binder from about 10% up to about 20% dry weight; or
mixing the particles of the gypsum core with a non-cementitious binder from about 1% up to about 10% dry weight.

8. The method of claim 1 wherein mixing the particles of the gypsum core with the binder includes one of:
mixing the particles of the gypsum core with an agar agar binder of about 1% to about 5% dry weight;
mixing the particles of the gypsum core with a sodium alginate binder from about 1% up to about 10%; or
mixing the particles of the gypsum core with a sodium alginate binder from about 1% up to about 10%.

9. A foamed insulation material produced from a gypsum waste, the formed insulation material comprising:
about 30% to about 90% by dry weight of the particles of gypsum from the gypsum waste;

about 2% to about 15% by dry weight of a paper waste; and wherein the foamed insulation material has:
a dry density range of about 0.2 to about 0.4 g/cm$^3$;
a thermal conductivity ranging from 0.036 W/mK to 0.053 W/mK; and
a resistance to heat transfer from RSI 0.189/cm to RSI 0.916/cm; and
wherein the foamed insulation material has a microstructure that includes a scaffold structure formed by a plurality of paper waste fibers, the scaffold structure having interstitial voids and carrying the particles of gypsum bound to one another and to the scaffold material via the binder.

10. The foamed insulation material of claim 9 wherein the gypsum waste includes gypsum sandwiched between facing and backing papers, and wherein the paper waste includes the facing and backing papers not removed from the gypsum waste.

11. The foamed insulation material of claim 9 wherein the gypsum waste includes gypsum sandwiched between facing and backing papers, and wherein the paper waste includes the facing and backing papers not removed from the gypsum waste and an additional paper waste different than the facing and backing papers of the gypsum waste.

12. The foamed insulation material of claim 9, further comprising a plurality of aggregates of up to 20% dry weight, the plurality of aggregates include one or more of sand, stone, gravel, slag, fly ash, glass, silica, expanded slate, clay, pumice, perlite, diatomaceous earth, shale, crushed rock, straw, glass fiber, cellulose fiber, or plastic fiber.

13. The foamed insulation material of claim 9 wherein the binder includes a cementitious binder of up to about 20% dry weight.

14. The foamed insulation material of claim 9 wherein the binder includes a cementitious binder of up to about 20% dry weight, and wherein the cementitious binder includes at least one of Portland cement, a synthetic pozzolan, or a natural pozzolan.

15. The foamed insulation material of claim 9 wherein the binder includes a cementitious binder that contains at least one of fly ash, ground granulated blast furnace slag, silica fume, volcanic ash, wood ash, or lime.

16. The foamed insulation material of claim 9 wherein the binder includes a combination of Portland cement and pozzolans, and wherein a percentage ratio of pozzolans to Portland cement is about 1 percent (%) up to about 100 percent (%).

17. The foamed insulation material of claim 9 wherein the binder includes a plant-based or algae-based biopolymer.

18. The foamed insulation material of claim 9 wherein the binder includes sodium alginate or agar agar.

19. The foamed insulation material of claim 9 wherein the foamed insulation material has a fire protective burn-through time of greater than about one hour and forty minutes per inch of thickness.

20. The foamed insulation material of claim 9 wherein the foamed insulation material is configured as at least one of a rigid insulation panel; a pourable, blown, or sprayed insulation material; the insulating component of a composite structural panel; an insulating component of an exterior insulation finishing system; hollow insulating formwork for concrete; a pourable, blown, or sprayed material for excavation backfill.

* * * * *